(12) United States Patent
Tanimoto

(10) Patent No.: US 9,638,257 B2
(45) Date of Patent: May 2, 2017

(54) ROLLING BEARING APPARATUS

(71) Applicant: JTEKT CORPORATION, Osaka-shi, Osaka (JP)

(72) Inventor: Kiyoshi Tanimoto, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/015,024

(22) Filed: Feb. 3, 2016

(65) Prior Publication Data
US 2016/0238078 A1    Aug. 18, 2016

(30) Foreign Application Priority Data
Feb. 16, 2015   (JP) ................. 2015-027329

(51) Int. Cl.
| | |
|---|---|
| F16C 37/00 | (2006.01) |
| F16C 33/66 | (2006.01) |
| F16C 33/58 | (2006.01) |
| F16C 19/06 | (2006.01) |

(52) U.S. Cl.
CPC .......... *F16C 37/007* (2013.01); *F16C 33/586* (2013.01); *F16C 33/6681* (2013.01); *F16C 19/06* (2013.01); *F16C 2322/39* (2013.01)

(58) Field of Classification Search
CPC .... F16C 33/586; F16C 33/66; F16C 33/6637; F16C 33/664; F16C 33/6659; F16C 33/6677; F16C 33/6681; F16C 19/06; F16C 37/007
See application file for complete search history.

(56) References Cited

U.S. PATENT DOCUMENTS

| | | | | |
|---|---|---|---|---|
| 2,878,894 A | * | 3/1959 | Andrews ............ | F16C 33/6659 184/6.9 |
| 3,743,369 A | * | 7/1973 | Langstrom .......... | F16C 33/3856 384/470 |
| 4,787,757 A | * | 11/1988 | Finger ................... | F16C 19/385 384/470 |
| 5,547,060 A | * | 8/1996 | Giese ...................... | F16C 19/48 192/110 B |
| 5,749,660 A | * | 5/1998 | Dusserre-Telmon . | F16C 19/166 384/475 |
| 7,244,096 B2 | * | 7/2007 | Dins ....................... | F01D 25/20 415/88 |

(Continued)

FOREIGN PATENT DOCUMENTS

JP     2014-062616 A     4/2014

*Primary Examiner* — Alan B Waits
(74) *Attorney, Agent, or Firm* — Oliff PLC

(57) ABSTRACT

A rolling bearing apparatus includes a bearing portion having an outer ring, an inner ring, a plurality of balls, and a cage that holds the balls, and an auxiliary portion provided adjacently to the bearing portion in an axial direction. The auxiliary portion has an auxiliary body portion provided adjacently to the outer ring in the axial direction and an extension portion extending in the axial direction from the auxiliary body portion and interposed between the cage and the inner ring. In the extension portion, a channel is formed that penetrates the extension portion in a direction inclined with respect to a radial direction. The channel is open in an outer peripheral surface of the extension portion, which faces the cage, and in an inner peripheral surface of the extension portion, which faces the inner ring.

8 Claims, 4 Drawing Sheets

(56) References Cited

U.S. PATENT DOCUMENTS

| | | | |
|---|---|---|---|
| 7,384,197 B2* | 6/2008 | Plona | F16C 33/58 |
| | | | 184/11.2 |
| 7,909,513 B2* | 3/2011 | Ueno | F16C 19/163 |
| | | | 384/470 |
| 8,529,135 B2* | 9/2013 | Duffy | F16C 33/6681 |
| | | | 384/385 |
| 8,979,383 B2* | 3/2015 | Carter | F16C 33/6677 |
| | | | 384/465 |
| 9,429,195 B2* | 8/2016 | Hasama | F16C 33/6651 |
| 9,541,137 B2* | 1/2017 | Mori | F16C 33/76 |
| 2005/0063627 A1* | 3/2005 | Ueda | F16C 19/163 |
| | | | 384/523 |
| 2005/0141796 A1* | 6/2005 | Katsuzawa | F16C 33/6618 |
| | | | 384/473 |
| 2009/0148087 A1* | 6/2009 | Suzuki | F16C 33/3806 |
| | | | 384/462 |
| 2011/0170818 A1* | 7/2011 | Yamamoto | F16C 19/26 |
| | | | 384/470 |
| 2013/0094792 A1* | 4/2013 | Schwartz | F16C 33/6637 |
| | | | 384/462 |
| 2015/0226266 A1 | 8/2015 | Mori et al. | |
| 2016/0305480 A1* | 10/2016 | Wang | F16C 33/6629 |
| 2016/0356315 A1* | 12/2016 | Hasama | F16C 33/6659 |
| 2016/0377123 A1* | 12/2016 | Yoshino | B23Q 11/123 |
| | | | 384/476 |

* cited by examiner

ROLLING BEARING APPARATUS

INCORPORATION BY REFERENCE

The disclosure of Japanese Patent Application No. 2015-027329 filed on Feb. 16, 2015 including the specification, drawings and abstract, is incorporated herein by reference in its entirety.

BACKGROUND OF THE INVENTION

1. Field of the Invention

The present invention relates to a rolling bearing apparatus.

2. Description of Related Art

For various machine tools, there has recently been a demand to increase the speed of a main spindle in order to improve machining efficiency and productivity. When the main spindle rotates at high speed, an increased amount of heat is generated in a bearing that supports the main spindle. Therefore, such a bearing needs means for suppressing increase in temperature of the main spindle.

As the means for suppressing increase in temperature of the bearing, a method for cooling the bearing in operation is available. For this method, for example, a cooling structure described in Japanese Patent Application Publication No. 2014-62616 (JP 2014-62616 A) is available. This cooling structure supplies the bearing with compressed air in addition to oil air, thereby suppressing increase in temperature of the bearing.

In the cooling structure for a bearing apparatus described in JP 2014-62616 A, a first nozzle through which the oil air is injected is provided in an outer-ring spacer. A unit that allows oil air to be generated is provided outside the bearing. A channel that connects this mechanism to the first nozzle is provided in a housing for the bearing or the like.

In the cooling structure described in JP 2014-62616 A, a second nozzle through which the compressed air is injected is further provided in the outer-ring spacer. A unit for generating the compressed air is provided outside the bearing. A channel that connects this mechanism to the second nozzle is provided in the housing for the bearing or the like.

As described above, the related art described in JP 2014-62616 is provided with the configuration for feeding the compressed air outside the bearing to the inside of the bearing in order to enhance a cooling effect for the bearing, besides the configuration for lubrication with the oil air that is needed to lubricate the bearing. Thus, the conventional bearing apparatus generally has a complicated structure. The necessity of cooling of the bearing is not limited to the machine tool as described above but is also present in other types of equipment in which a shaft rotates at high speed.

SUMMARY OF THE INVENTION

An object of the present invention is to provide a rolling bearing apparatus that enables a cooling effect to be enhanced without external supply of compressed air, suppressing increase in temperature of a bearing.

A rolling bearing apparatus in an aspect of the present invention includes a bearing portion having a fixed ring, a rotating ring arranged concentrically with the fixed ring, a plurality of rolling elements interposed between the fixed ring and the rotating ring, and a cage that holds the rolling elements, and an auxiliary portion provided adjacently to the bearing portion in an axial direction. The auxiliary portion has an auxiliary body portion provided adjacently to the fixed ring in the axial direction and an extension portion extending in the axial direction from the auxiliary body portion and interposed between the cage and the rotating ring. In the extension portion, a channel is formed that penetrates the extension portion in a direction inclined with respect to a radial direction and that is open in a surface of the extension portion, which faces the cage, and in a surface of the extension portion, which faces the rotating ring.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
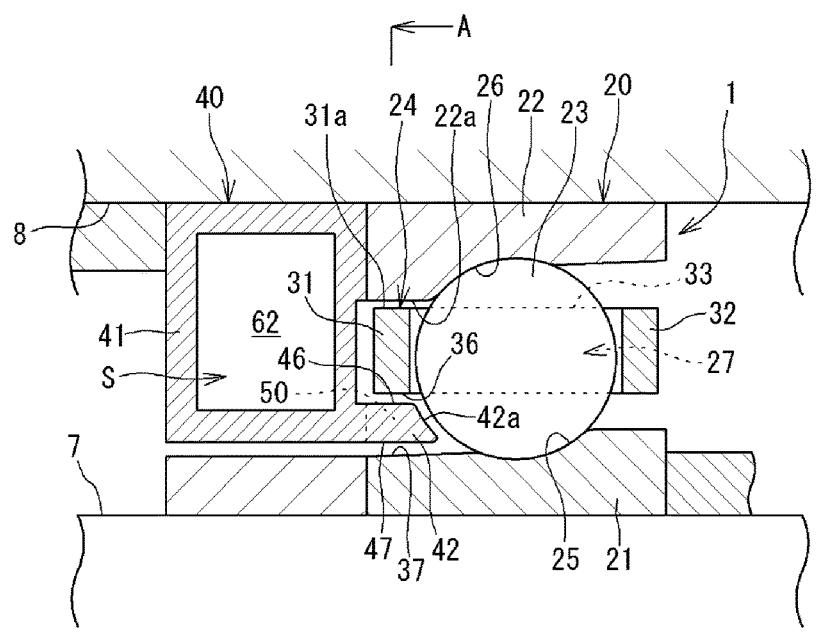
FIG. 1 is a sectional view depicting an embodiment of a rolling bearing apparatus.

An embodiment of the present invention will be described based on the drawings. FIG. 1 is a sectional view depicting an embodiment of a rolling bearing apparatus 1. The rolling bearing apparatus 1 includes a bearing portion 20 and an auxiliary portion 40. The bearing portion 20 substantially supports a shaft 7. The auxiliary portion 40 functions for the bearing portion 20. The rolling bearing apparatus 1 in the present embodiment is housed in a bearing housing 8 in order to support a main spindle (shaft 7) of a machine tool such that the main spindle is rotatable.

The bearing portion 20 has an inner ring 21, an outer ring 22, a plurality of balls (rolling elements) 23, and a cage 24 that holds the balls 23. The inner ring 21 is a cylindrical member externally fitted over the shaft 7 and having a raceway groove (hereinafter referred to as an inner-ring raceway groove 25) formed on an outer periphery of the inner ring 21 as a raceway surface. The outer ring 22 is a cylindrical member fixed to an inner peripheral surface of the bearing housing 8 and having a raceway groove (hereinafter referred to as an outer-ring raceway groove 26) formed on an inner periphery of the outer ring 22 as a raceway surface. In the present embodiment, the inner ring 21, which is a rotating ring (rotating raceway ring), rotates with the shaft 7 with respect to the outer ring 22, which is a fixed ring (fixed raceway ring).

The balls 23 are interposed between the inner ring 21 and the outer ring 22 and roll through the inner-ring raceway groove 25 and the outer-ring raceway groove 26. Thus, the inner ring 21 and the outer ring 22 are concentrically arranged. In the present embodiment, the balls 23 contact the raceway grooves 25 and 26 at a certain contact angle. The bearing portion 20 forms an angular ball bearing.

The cage 24 has a pair of ring portions 31 and 32 and column portions 33 that join the ring portions 31 and 32 together. A pocket 27 is defined as an area enclosed by the ring portions 31 and 32 and the pair of column portions 33 and 33 adjacent to each other in a circumferential direction. The cage 24 is an annular member and has a plurality of pockets formed along the circumferential direction. One ball 23 is housed in each of the pockets 27. Consequently, the cage 24 can hold the balls 23 arranged in the circumferential direction. Each of the ring portions 31 and 32 is provided between the inner ring 21 and the outer ring 22 adjacently to the balls 23 in the axial direction. A radially outer surface 31a of the first ring portion 31 can come into sliding contact with an inner peripheral surface 22a of the outer ring 22. The cage 24 is positioned by the outer ring 22 in the radial direction (outer ring guidance).

The auxiliary portion 40 has generally a ring shape and is provided adjacently to the bearing portion 20 in the axial direction. The auxiliary portion 40 has an auxiliary body portion 41 and an extension portion 42. The auxiliary body portion 41 has a ring shape. The extension portion 42 extends from the auxiliary body portion 41 in the axial direction.

The auxiliary body portion 41 is provided adjacently to the outer ring 22, which is a fixed ring, in the axial direction. In the present embodiment, the auxiliary body portion 41 is separate from the outer ring 22 and also functions as an outer-ring spacer. Thus, the auxiliary body portion 41 is an annular member (annular case) formed of metal so as to be rigid and internally having a space S. In the space S, a tank 62 and a pump 61 for lubricant (oil) (see FIG. 4) described below are provided. A part of the auxiliary body portion 41, which is subjected to an axial load and a preload, may be exclusively formed of metal. In other words, a part of the auxiliary body portion 41, which is not subjected to the axial load or the preload, may be formed of resin or the like instead of metal. In this case, specifically, the extension portion 42 may be formed of resin.

The extension portion 42 extends from a part of the auxiliary body portion 41 (a side surface of a radially inner portion) to the vicinity of the balls 23. The extension portion 42 is interposed between the first ring portion 31 of the cage 24 and the inner ring 21. The extension portion 42 extends toward the balls 23. A tip 42a of the extension portion 42 has a shape (spherical shape) conforming to an outer peripheral shape (spherical shape) of each of the balls 23. A gap is formed between the tip 42a and the ball 23.

Figure 2:
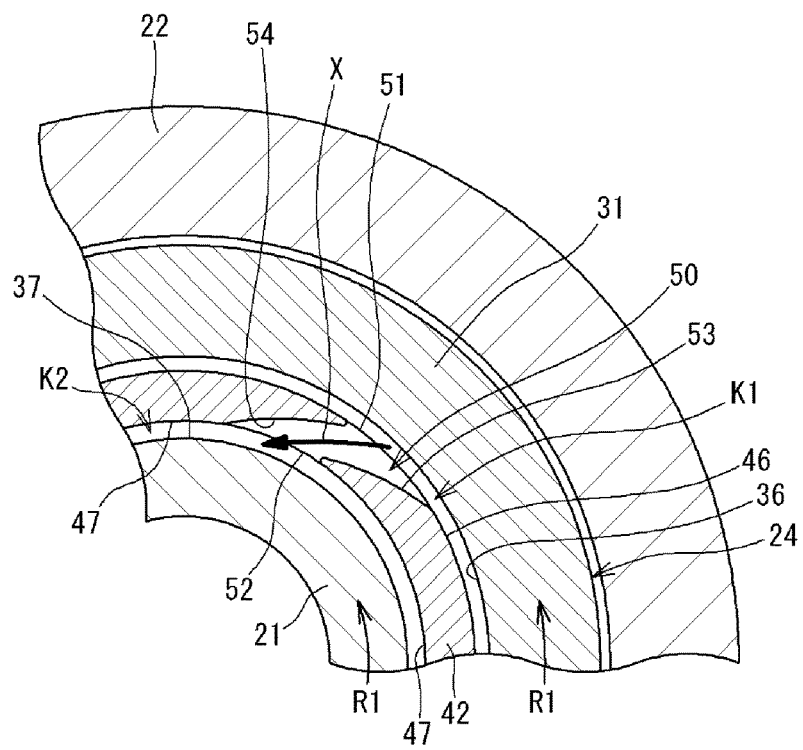
FIG. 2 is a sectional view taken along a direction of arrow A in FIG. 1.

FIG. 2 is a sectional view taken in a direction of arrow A in FIG. 1. In the present embodiment, the extension portion 42 is provided to have an annular shape. An outer peripheral surface (radially outer surface) 46 of the extension portion 42 faces an inner peripheral surface 36 of the first ring portion 31 of the cage 24 in the radial direction. An inner peripheral surface (radially inner surface) 47 of the extension portion 42 faces an outer peripheral surface 37 of the inner ring 21 in the radial direction. A channel 50 is formed in the extension portion 42. In a section (transverse section) orthogonal to a center line of the rolling bearing apparatus 1 (auxiliary body portion 41), the channel 50 penetrates the extension portion 42 in a direction inclined with respect to the radial direction. Consequently, the channel 50 is open in the outer peripheral surface 46 facing the first ring portion 31 of the cage 24 and in the inner peripheral surface 47 facing the inner ring 21. In FIG. 2, the opening of the channel 50 that is closer to the cage 24 is a first opening 51, and the opening of the channel 50 that is closer to the inner ring 21 is a second opening 52.

The channel 50 in the present embodiment has an inner inclined surface 53 inclined in a rotating direction (in FIG. 2, the direction of arrow R1) with respect to the radial direction, from the cage 24 side toward the inner ring 21 side. The rotating direction (the direction of arrow R1) is the rotating direction of the inner ring 21. The inner ring 21 rotates with respect to the outer ring 22 so that the balls 23 and the cage 24 also rotate in the same direction. Thus, the rotating direction (the direction of arrow R1) is also the rotating direction of the cage 24. The channel 50 has an outer inclined surface 54 facing the inner inclined surface 53 positioned on the inner side in the radial direction.

Figure 3:
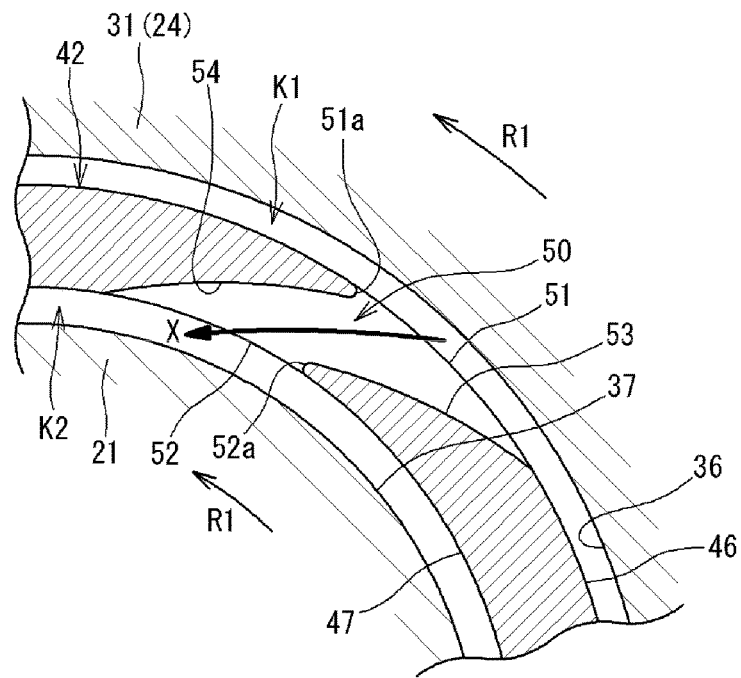
FIG. 3 is an enlarged view of FIG. 2 for illustrating a channel.

FIG. 3 is an enlarged view of FIG. 2 for illustrating the channel 50. The channel 50 has a portion with a channel width decreasing from the cage 24 toward the inner ring 21. The channel width is a width dimension of the channel 50 in the section (transverse section) orthogonal to the center line of the rolling bearing apparatus 1 (auxiliary body portion 41). The channel width is an interval between the inner inclined surface 53 and the outer inclined surface 54 (an interval dimension along a virtual circle that is concentric with the auxiliary body portion 41 and that has the same diameter as that of the auxiliary body portion 41). In the present embodiment, the channel width decreases over the entire length of the channel 50 toward the inner ring 21, and the second opening 52 is narrower than the first opening 51. In other words, in the transverse section, the interval between the inner inclined surface 53 and the outer inclined surface 54 decreases from the cage 24 toward the inner ring 21.

The channel 50 is preferably formed in at least one area of the extension portion 42 but may be formed in a plurality of areas. The number of the channels 50 may be changed in accordance with the size of the bearing portion 20 or the like.

In the rolling bearing apparatus 1 configured as described above, when the inner ring 21 rotates as described above, the cage 24 also rotates in the same direction. Rotation of the cage 24 causes air present in an annular space K1 (see FIG. 3) between the first ring portion 31 and the extension portion 42 to be entrained by the first ring portion 31, due to the air viscosity, to flow along the circumferential direction. Then, part of the air flowing along the circumferential direction can flow along the channel 50 formed in the extension portion 42 (arrow X in FIG. 3). Then, the air having flowed out through the channel 50 is blown against the outer peripheral surface 37 of the inner ring 21. In other words, part of the air entrained by the first ring portion 31 of the cage 24 can enter the channel 50 through the first opening 51 and exits the channel 50 through the second opening 52. Part of the air having exited through the second opening 52 has a radially inward velocity component and is thus blown against the outer peripheral surface 37 of the inner ring 21.

In particular, in the present embodiment, the channel 50 has a channel width decreasing from the first opening 51 toward the second opening 52. Thus, upon passing through the channel 50, part of the air has an elevated pressure and can be blown hard against the inner ring 21.

The inner ring 21 is also rotating, and thus, the air flowing out through the channel 50 is drawn into an annular space K2 between the inner ring 21 and the extension portion 42 by the rotating inner ring 21. As a result, the flow of the air through the channel 50 can be activated.

In the rolling bearing apparatus 1 in the present embodiment, the air can be blown against the inner ring 21 through the channel 50 utilizing the rotational energy of the cage 24 and the inner ring 21 as described above. Thus, a cooling effect can be enhanced with the air flowing through the channel 50 without the need to supply external compressed air. Consequently, it is possible to suppress increase in temperature of the bearing portion 20 (particularly the inner ring 21).

The channel 50 will further be described with reference to FIG. 3. The inner inclined surface 53 and the outer inclined surface 54 forming the channel 50 each have a smooth curved shape so as to reduce resistance against the flowing air. In a transverse section depicted in FIG. 3, the inner inclined surface 53 is formed of a convex curved surface. The outer inclined surface 54 is formed of a recessed curved surface. These curved surfaces are spiral. This facilitates the flow of the air through the channel 50.

In the channel 50, a forward portion 51a of the first opening 51 in the rotating direction, which is an air inlet, and a rearward portion 52a of the second opening 52 in the rotating direction, which is an air outlet, are chamfered (rounded) so as not to form knife edges. This suppresses disturbance of the flowing air.

Figure 6:
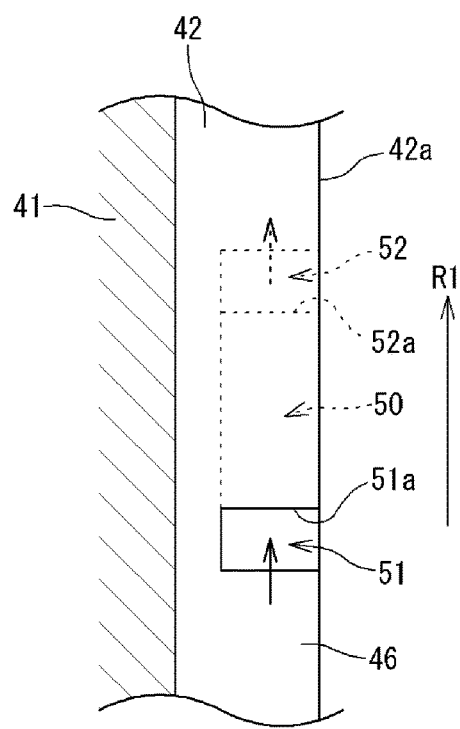
FIG. 6 is a diagram illustrating an extension portion as viewed from outside in a radial direction.

FIG. 6 is a diagram illustrating the extension portion 42 as viewed from the outside in the radial direction. In the extension portion 42 of the present embodiment, the channel 50 is open not only on the inner and outer sides of the extension portion 42 (openings 51 and 52) in the radial direction but also toward the interior of the bearing (rightward in FIG. 6) in the axial direction.

Figure 7:
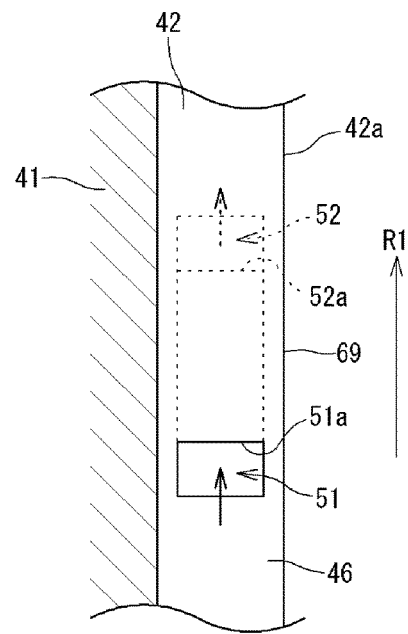
FIG. 7 is a diagram depicting a variation of the extension portion depicted in FIG. 6.

FIG. 7 is a diagram illustrating a variation of the extension portion 42 depicted in FIG. 6. In the extension portion 42 depicted in FIG. 7, the channel 50 is open on the inner and outer sides of the extension portion 42 (openings 51 and 52) but is closed in the axial direction unlike the extension portion 42 in FIG. 6. In other words, the extension portion 42 has a side wall portion 69 located between the channel 50 and the bearing interior (balls 23) to close the channel 50 in the axial direction. The side wall portion 69 enables the air entrained by the rotating balls 23 to be prevented from affecting the air flowing through the channel 50. In other words, when the inner ring 21 rotates at high speed, the balls 23 also rotate around the inner ring 21, with the air entrained by the rotating balls 23. When the tip 42a (see FIG. 1) of the extension portion 42 is close to the balls 23, the air entrained by the balls 23 may disturb the air flowing through the channel 50. However, the side wall portion 69 depicted in FIG. 7 can prevent occurrence of such disturbance and facilitates smooth flow of the air toward the inner ring 21 through the channel 50. The mode in FIG. 6 is easier in formation of the channel 50 than the mode in FIG. 7.

Figure 4:
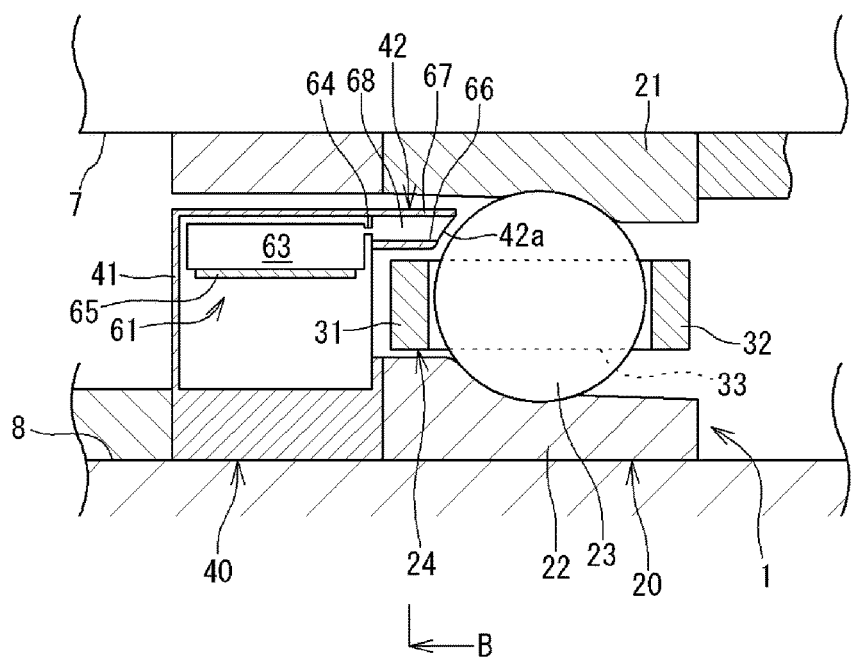
FIG. 4 is a sectional view depicting a portion of the rolling bearing apparatus, which is on the opposite side of a center line of the rolling bearing apparatus from the portion depicted in FIG. 1.

FIG. 4 is a sectional view of a portion different from the portion depicted in FIG. 1. As described above, the auxiliary portion 40 has the auxiliary body portion 41, which is shaped like a ring. The auxiliary body portion 41 is provided adjacently to the outer ring 22 in the axial direction. The auxiliary body portion 41 has a pump 61 that discharges lubricant (oil) toward the bearing interior in which the balls 23 are present.

The pump 61 in the present embodiment has a reservoir portion 63 and an actuator (piezo element) 65. The reservoir portion 63 is an area in which the lubricant is stored. The actuator 65 pushes out the lubricant in the reservoir portion 63 through a discharge port 64. The lubricant is fed from the tank 62 (see FIG. 1) to the reservoir portion 63. An operation performed by the pump 61 to discharge the lubricant is controlled by a control unit not depicted in the drawings. The pump 61 discharges the lubricant toward the balls 23 in the form of oil droplets. The oil droplets discharged through the discharge port 64 have a predetermined flow velocity and can gush out through the discharge port 64 and impinge on the balls 23. A very small amount of lubricant in picoliter or nanoliter scale is discharged by the pump 61 per shot.

Although not depicted in the drawings, the auxiliary body portion 41 may include a power supply for the pump 61 (a generator, a battery, or the like), various sensors (sensors for detection of temperature, vibration, the state of oil film, and the like), and a control unit that controls the pump 61 based on outputs from the sensors. These components and the tank 62 may be provided outside the rolling bearing apparatus 1.

Figure 5:
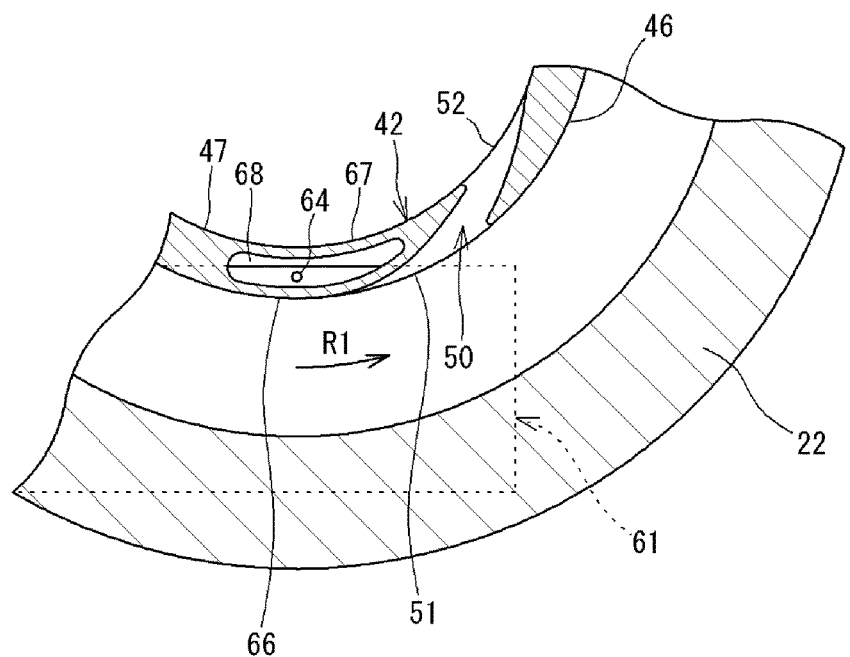
FIG. 5 is a sectional view taken in a direction of arrow B in FIG. 4.

FIG. 5 is a sectional view taken in a direction of arrow B in FIG. 4. In FIG. 4 and FIG. 5, the extension portion 42 has a first wall portion (outer peripheral wall portion) 66 located closer to the first ring portion 31 of the cage 24. The extension portion 42 has a second wall portion (inner peripheral portion) 67 located closer to the inner ring 21. A hollow portion 68 is formed between the wall portions 66 and 67. The hollow portion 68 is formed in a portion of the extension portion 42 in which the channel 50 is not formed (see FIG. 5). In the hollow portion 68, the discharge port 64 of the pump 61 is open toward the balls 23. The oil droplets (lubricant) discharged through the discharge port 64 move through the hollow portion 68 toward the bearing interior where the balls 23 are present, and can reach the balls 23.

The significance of the wall portions 66 and 67 (hollow portion 68) provided in the extension portion 42 will be described. In the rolling bearing apparatus 1 in the present embodiment, when the inner ring 21 rotates at high speed, a flow in the rotating direction occurs in the air present in the annular space between the inner ring 21 and the outer ring 22. Therefore, even when discharged toward the bearing interior from the pump 61 provided adjacently to the bearing portion 20 having the inner ring 21 and the outer ring 22, the oil droplets (lubricant) may be caught in the air flow and fail to efficiently reach the balls 23. However, in the present embodiment, the oil droplets discharged from the pump 61 pass through the hollow portion 68 of the extension portion 42 as described above. At this time, the wall portions 66 and 67 function as a windshield. As a result, the oil droplets are reliably fed to the bearing interior where the balls 23 are present, and can reach the balls 23. Thus, the bearing portion 20 can achieve lubricity. The wall portions 66 and 67 (hollow portion 68) enable the lubricant to be fed to the balls 23 even without causing the pump 61 to discharge the oil droplets near the balls 23. Discharging a very small amount of lubricant (oil droplets) near the balls 23 needs an elongate nozzle extending from the pump 61. However, such a nozzle is not necessary for the present embodiment.

Figure 8:
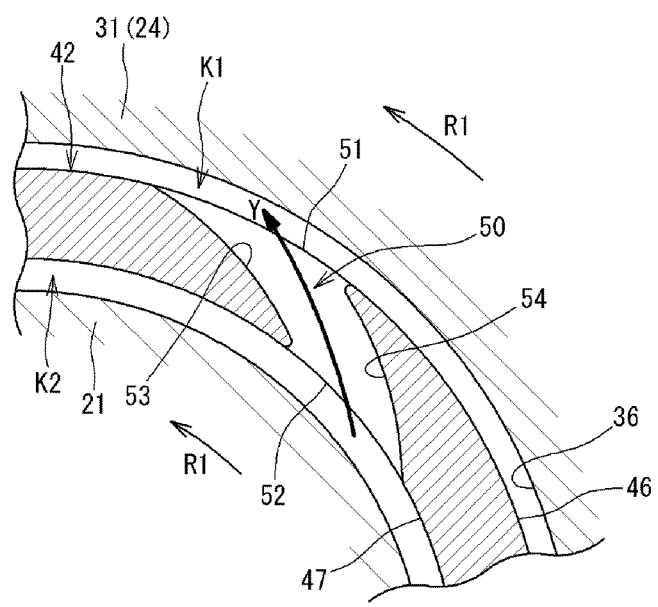
FIG. 8 is a diagram illustrating another mode of the channel formed in the extension portion.

FIG. 8 is a diagram illustrating another mode of the channels 50 formed in the extension portion 42. In the mode depicted in FIG. 3, the channel 50 has the inner inclined surface 53 inclined in the rotating direction (in FIG. 3, the direction of arrow R1) with respect to the radial direction, from the radial outer side (cage 24 side) toward the radial inner side (inner ring 21 side). In the mode depicted in FIG. 8, the direction of inclination of the channel 50 is opposite to that in the mode in FIG. 3. The remaining part of the configuration is the same, and description of the same points is omitted.

As depicted in FIG. 8, the channel 50 is formed in the extension portion 42. In a section (transverse section) orthogonal to the center line of the rolling bearing apparatus 1 (auxiliary body portion 41), the channel 50 penetrates the extension portion 42 in a direction inclined with respect to the radial direction. Consequently, the channel 50 is open in the outer peripheral surface 46 facing the first ring portion 31 of the cage 24 and in the inner peripheral surface 47 facing the inner ring 21. In FIG. 8, the opening of the channel 50 that is closer to the cage 24 is the first opening 51, and the opening of the channel 50 that is closer to the inner ring 21 is the second opening 52

The channel 50 depicted in FIG. 8 has the outer inclined surface 54 inclined in the rotating direction (in FIG. 8, in the direction of arrow R1) with respect to the radial direction, from the inner ring 21 side toward the cage 24 side. The rotating direction (the direction of arrow R1) is the rotating direction of the inner ring 21. The inner ring 21 rotates with respect to the outer ring 22 so that the balls 23 and the cage 24 also rotate in the same direction. Thus, the rotating direction (the direction of arrow R1) is also the rotating direction of the cage 24. The channel 50 has the inner inclined surface 53 facing the outer inclined surface 54 positioned on the outer side in the radial direction.

With the channel 50, rotation of the inner ring 21 causes the air present in an annular space K2 between the inner ring 21 and the extension portion 42 to be entrained by the inner ring 21, due to the air viscosity, to flow along the circumferential direction. Then, part of the air flowing along the circumferential direction can flow along the channel 50 formed in the extension portion 42 (arrow Y in FIG. 8). Then, the air having flowed out through the channel 50 is blown against the inner peripheral surface 36 of the first ring portion 31 of the cage 24 and further against the balls 23 held by the cage 24. In other words, part of the air entrained by the inner ring 21 enters the channel 50 through the second opening 52 and exits the channel 50 through the first opening 51. Part of the air having exited through the first opening 51 has a radially outward velocity component and is thus blown against the inner peripheral surface 36 of the first ring portion 31 of the cage 24.

In particular, in the case depicted in FIG. 8, the channel 50 has a portion with a channel width in the transverse section decreasing from the inner ring 21 toward the first ring portion 31 of the cage 24. In this configuration, upon passing through the channel 50, the air has an elevated pressure and can be blown hard against the cage (rolling elements).

The cage 24 is also rotating, and thus, the air flowing out through the channel 50 is drawn into the annular space K1 between the cage 24 and the extension portion 42 by the rotating cage 24. As a result, the flow of the air through the channel 50 can be activated.

As described above, in the rolling bearing apparatus 1 depicted in FIG. 8, the air can be blown against the cage 24 (balls 23) through the channel 50 utilizing the rotational energy of the inner ring 21 and the cage 24. Thus, the cooling effect can be enhanced with the air flowing through the channel 50 without the need to supply external compressed air. Consequently, it is possible to suppress increase in temperature of the bearing portion 20 (particularly the cage 24 or the balls 23).

The rolling bearing apparatus 1 in the above-described embodiments eliminates the need for a unit for generating compressed air as used in the related art in order to suppress increase in temperature of the bearing portion 20. This simplifies the configuration. Furthermore, the function to blow air through the channel 50 in the extension portion 42 is enhanced by increasing the rotation speeds of the shaft 7 and the inner ring 21. Thus, the rolling bearing apparatus 1 is preferable for equipment that rotates at high speed. Since the pump 61 (see FIG. 4 and FIG. 5) is incorporated in the rolling bearing apparatus 1, the rolling bearing apparatus 1 is free from maintenance for a long period of time. Also, it is possible to use the rolling bearing apparatus 1 in an environmentally friendly manner, with the amount of lubricant scattering from the rolling bearing apparatus 1 reduced.

The rolling bearing apparatus 1 in the present invention is not limited to the illustrated mode but may be in another mode within the scope of the present invention. In the above-described embodiments, the case has been described in which the bearing portion 20 is an angular ball bearing. However, the mode of the bearing is not limited to this but may be a deep-groove ball bearing, a tapered roller bearing, or a cylindrical roller bearing. The rolling bearing apparatus 1 may be used for applications other than the main spindle for the machine tool.

In the above-described embodiments, the case has been described in which the inner ring 21 is a rotating ring. However, the outer ring 22 may be a rotating ring, and the inner ring 21 may be a fixed ring. In this case, the extension portion 42 provided in the auxiliary portion 40 may be formed between the outer ring 22 and the first ring portion 31 of the cage 24. In the above-described embodiments, the outer ring 22 is separate from the auxiliary body portion 41 (see FIG. 2). However, the outer ring 22 and the auxiliary body portion 41 may be integral and non-divisible and may be formed of a single annular member. Moreover, in the auxiliary portion 40, the pump 61 may have an elongate nozzle, the tip of which serves as a discharge port.

A referential invention will be described. In some cases, as means for feeding lubricant to the bearing to lubricate the bearing, a pump is provided adjacently to the bearing portion having the inner ring, the outer ring, and the like to discharge the lubricant to the interior of the bearing. When the outer ring is a fixed ring and the inner ring is a rotating ring, high-speed rotation of the inner ring causes a flow in the air present in the space between the inner ring and the outer ring in the rotating direction. Therefore, even when discharged toward the bearing interior from the pump provided adjacently to the bearing portion, the lubricant may be caught in the air flow and fail to efficiently reach the rolling elements. Thus, as a referential invention, a rolling bearing apparatus will be described which enables the lubricant discharged between the fixed ring and the rotating ring to reach the rolling elements. To facilitate understanding of the referential invention, the reference numerals used in FIGS. 1 to 8 are parenthesized.

The rolling bearing apparatus in the referential invention includes a bearing portion (20) having a fixed ring (22), a rotating ring (21) arranged concentrically with the fixed ring (22), a plurality of rolling elements (23) interposed between the fixed ring (22) and the rotating ring (21), and a cage (24) that holds the rolling elements (23), and an auxiliary portion (40) provided adjacently to the bearing portion (20) in the axial direction. The auxiliary portion (40) has an auxiliary body portion (41) provided adjacently to the fixed ring (22) in the axial direction and an extension portion (42) extending in the axial direction from the auxiliary body portion (41) and interposed between the cage (24) and the rotating ring (21). The auxiliary body portion (41) has a pump (61) that discharges lubricant toward the bearing interior where the rolling elements (23) are present. The extension portion (42) has wall portions (66 and 67) located closer to the cage (24) and to the rotating ring (21), respectively, to form a hollow portion (68) between the wall portions (66 and 67). The lubricant discharged from the pump (61) moves through the hollow portion (68) toward the bearing interior.

In the referential invention, the lubricant discharged from the pump (61) passes through the hollow portion (68) of the extension portion (42). At this time, the wall portions (66 and 67) function as windshields. The lubricant is fed to the bearing interior where the rolling elements (23) are present, and can reach the rolling elements (23). As a result, the bearing portion (20) can achieve lubricity. The configurations of the portions of the rolling bearing apparatus 1 described in the above-described embodiments (FIGS. 1 to 8) can be applied to the referential invention.

In the present invention, the air can be blown against the rotating ring or the cage through the channel formed in the extension portion of the auxiliary portion utilizing the rotational energy of the rolling bearing apparatus. Consequently, the cooling effect can be enhanced without the need to supply external compressed air as in the related art. Thus, it is possible to suppress increase in temperature of the bearing portion. This eliminates the need for a unit for generating compressed air as in the related art, simplifying the configuration of the rolling bearing apparatus.

What is claimed is:

1. A rolling bearing apparatus comprising:
   a bearing portion having a fixed ring, a rotating ring arranged concentrically with the fixed ring, a plurality of rolling elements interposed between the fixed ring and the rotating ring, and a cage that holds the rolling elements; and
   an auxiliary portion provided adjacently to the bearing portion in an axial direction, wherein
   the auxiliary portion has an auxiliary body portion provided adjacently to the fixed ring in the axial direction and an extension portion extending in the axial direction from the auxiliary body portion and interposed between the cage and the rotating ring, and
   in the extension portion, a channel is formed that penetrates the extension portion in a direction inclined with respect to a radial direction and that is open in a surface of the extension portion, which faces the cage, and in a surface of the extension portion, which faces the rotating ring.

2. The rolling bearing apparatus according to claim 1, wherein the channel has an inclined surface inclined in a rotating direction of the rotating ring with respect to the radial direction, from the cage side toward the rotating ring side.

3. The rolling bearing apparatus according to claim 2, wherein the auxiliary body portion has a pump that discharges lubricant toward a bearing interior where the rolling elements are present,
   the extension portion has a wall portion located closer to the cage and a wall portion located closer to the rotating ring to form a hollow portion between the wall portions, and
   the lubricant discharged from the pump flows through the hollow portion toward the bearing interior.

4. The rolling bearing apparatus according to claim 2, wherein the channel has a portion with a channel width decreasing from the cage toward the rotating ring.

5. The rolling bearing apparatus according to claim 4, wherein the auxiliary body portion has a pump that discharges lubricant toward a bearing interior where the rolling elements are present,
   the extension portion has a wall portion located closer to the cage and a wall portion located closer to the rotating ring to form a hollow portion between the wall portions, and
   the lubricant discharged from the pump flows through the hollow portion toward the bearing interior.

6. The rolling bearing apparatus according to claim 1, wherein the channel has an inclined surface inclined in a rotating direction of the rotating ring with respect to the radial direction, from the rotating ring side toward the cage side.

7. The rolling bearing apparatus according to claim 6, wherein the auxiliary body portion has a pump that discharges lubricant toward a bearing interior where the rolling elements are present,
   the extension portion has a wall portion located closer to the cage and a wall portion located closer to the rotating ring to form a hollow portion between the wall portions, and
   the lubricant discharged from the pump flows through the hollow portion toward the bearing interior.

8. The rolling bearing apparatus according to claim 1, wherein the auxiliary body portion has a pump that discharges lubricant toward a bearing interior where the rolling elements are present,
   the extension portion has a wall portion located closer to the cage and a wall portion located closer to the rotating ring to form a hollow portion between the wall portions, and
   the lubricant discharged from the pump flows through the hollow portion toward the bearing interior.

* * * * *